Patented June 22, 1943

2,322,575

UNITED STATES PATENT OFFICE 2,322,575

PREPARATION OF CELLULOSE MIXED ESTERS

Julian W. Hill, Wilmington, Del., assignor to E. I. du Pont de Nemours & Company, Wilmington, Del., a corporation of Delaware No Drawing. Application March 1, 1941, Serial No. 381,391

8 Claims. (Cl. 260—225)

This invention relates to the preparation of cellulose organic mixed esters, and more particularly to the direct preparation of partially esterified cellulose mixed esters, without resort to hydrolysis.

The known methods for producing the technically useful partially esterified organic mixed esters of cellulose involve the preparation of the fully esterified mixed ester and its subsequent hydrolysis to a predetermined degree of partial esterification. These methods are not entirely satisfactory from the commercial standpoint for the reason that they require a costly and time-consuming hydrolysis step.

An object of this invention therefore is in the provision of a method for the direct preparation of partially esterified cellulose organic mixed esters. A further object is to eliminate the hydrolysis step in the preparation of partially esterified cellulose organic mixed esters. These and other objects will more clearly appear hereinafter.

These objects are accomplished by the following invention which, briefly described, comprises reacting cellulose in the presence of at least 15% of its weight of an aldehyde, with an esterification reagent containing an unsubstituted aliphatic monocarboxylic acid, and the anhydride of a different unsubstituted aliphatic monocarboxylic acid. Partially esterified cellulose mixed esters are formed and are recovered from the reaction mixture in the usual fashion.

A preferred procedure for carrying out the method of this invention described in connection with the preparation of partially esterified cellulose acetate propionate, is as follows: Cellulose, which has been pretreated by any of the usual methods for activating cellulose for esterification, is esterified in a closed reaction vessel, having suitable means of agitation and of controlling the temperature of the reaction mixture, with a bath containing acetic acid, an amount of propionic anhydride in excess of that theoretically required to esterify the cellulose completely, sulfuric acid as catalyst, and 15 to 35 parts of acetaldehyde for each 100 parts of cellulose being esterified. The esterification is conducted at temperatures of 15° to 40° C. by customary esterification cycles until a smooth viscous solution of cellulose acetate propionate is obtained. The primary cellulose acetate propionate is precipitated from the reaction mixture by dilution with water or dilute acid without subjecting the ester to the usual hydrolysis step.

The invention is further described by the following examples wherein parts are by weight unless otherwise stated.

Example I

One hundred (100) parts of purified cotton linters is mixed by tumbling in a closed reaction vessel with 400 parts of glacial acetic acid and 2.5 parts of concentrated sulfuric acid for twenty hours at 25° C. A solution of 16 parts of acetaldehyde in 400 parts of propionic acid is added to the activated linters and the entire mixture cooled to 15° to 17° C. during one-half hour. Three hundred sixty (360) parts of propionic anhydride is then added and the esterification temperature controlled by external means. The temperature is allowed to increase gradually from 17° C. to 20° C. during two hours, and then to a maximum of 40° C. during a period of four hours and held at 40° C. until a solution substantially free of fiber is obtained, which requires about another three-quarters hour. The reaction mixture is immediately diluted with 800 parts of 30% aqueous acetic acid and then poured into cold water with violent agitation to precipitate the cellulose acetate propionate. After standing one-half hour in the precipitating liquor, the precipitated ester is washed in running cold water until acid-free and then dried at 50° to 65° C. The product is a partially esterified cellulose acetate propionate containing 1.13 acetyl and 1.71 propionyl groups per $C_6$ unit of the cellulose.

Example II

A partially esterified cellulose acetate propionate which is especially suitable for use as photographic film base or thin wrapping film is made as follows: Six hundred (600) parts of cotton linters is mixed thoroughly in a closed reaction vessel, which can be rotated, with a solution of 11 parts of concentrated sulfuric acid and 30 parts of 85% phosphoric acid in 3600 parts of glacial acetic acid at 25° C. during a period of five hours and then stored at 25° C. for another fifteen hours. The activated cellulose is then cooled to a temperature of 15° C. during one-half hour and a mixture of 3360 parts of propionic anhydride and 210 parts of acetaldehyde is added gradually over a period of twenty-five minutes with continuous agitation. The temperature of the reaction mixture is controlled by means of a water spray so that the temperature of the reaction mixture increases gradually from 15° C. to 20° C. during a period of three hours, then to 40° C. in another two and three-quarter hours, and held at 40° to 43° C. until a smooth solution substantially free of fiber is obtained. This requires about 1.3 hours at 40° to 43° C. The primary reaction mixture is immediately diluted with 1000 parts of acetone and precipitated by pouring into excess water at 65° C. After standing one-half hour in the precipitating liquor, the cellulose acetate propionate is washed acid-free and dried at 65° C. The product is a cellulose acetate propionate containing 1.75 acetyl groups and 1.09 propionyl groups per glucose unit of the cellulose. Films prepared from this ester dissolved in a solvent mixture consisting of 75 parts acetone and 25 parts butyl acetate have the following physical properties: Miles impact test, as described in U. S. Patent 2,218,146 to Fothergill, of 0.9″ with hammer #2, a pliability of $2.90 \times 10^{-6}$, elongation of 6%, and a tensile strength of 9070 lbs./sq. in. at the breaking point.

Example III

A cellulose acetate propionate containing 1.32 acetyl groups and 0.99 propionyl group per glucose unit is prepared by first treating 50 parts of cotton linters with a solution of 2.5 parts of 85% phosphoric acid and 0.9 part of concentrated sulfuric acid in 300 parts of glacial acetic acid for twenty hours at 25° C., following which the activated cellulose is cooled to 15° C. and a mixture of 280 parts of propionic anhydride with 20 parts of acetaldehyde added. The esterification is carried out in a closed reaction vessel capable of being rotated in a water bath and the reaction temperature controlled so that it increases slowly to 20° C. in three hours and then to a temperature of 37° C. in three and one-half hours more and continued at 35° to 40° C. for twenty-three and one-half hours. The primary cellulose mixed ester solution is diluted with 100 parts of acetone, then poured into 2000 parts of hot water (65° C.) with violent agitation. The product is washed and dried in the usual manner.

Example IV

A partially esterified cellulose acetate butyrate is prepared by pretreating 100 parts of purified cotton linters with a solution of 2.5 parts of concentrate sulfuric acid in 200 parts of glacial acetic acid for twenty hours at 25° C., following which a mixture of 200 parts of butyric acid and 15 parts of acetaldehyde is added to the pretreated linters and the reaction mass rotated in a closed container in a water bath at 15° C. for one-half hour. At this time, 300 parts of acetic anhydride is added and the reaction temperature controlled as described in Example I. When the primary reaction solution is substantially free of unesterified fibers, it is diluted with 400 parts of 30% acetic acid and then poured into 3000 parts of cold water with rapid agitation. The precipitated cellulose acetate butyrate, which contains about 2.85 total acyl groups, is washed and dried in the customary manner.

Example V

One hundred (100) parts of cotton linters is wet with excess water and the water is then displaced with glacial acetic acid. The acetic acid wet linters is then centrifuged to a total weight of 200 parts and a solution of 2.5 parts of concentrated sulfuric acid in 200 parts of glacial acetic acid is added, and the linters rotated at 25° C. for twenty hours in a closed reaction vessel. To the pretreated linters is then added a mixture of 25 parts of acetaldehyde in 400 parts of isobutyric acid and the entire mass cooled to 15° C. during a period of thirty minutes. Four hundred (400) parts of isobutyric anhydride is then added over a period of one-half hour, and the temperature gradually raised by the cycle described in Example I. The primary solution of cellulose acetate isobutyrate which is obtained is diluted with 400 parts of 30% acetic acid and then poured into 3000 parts of water with rapid stirring and the precipitated ester washed and dried in the usual manner. This cellulose ester is a partially esterified cellulose acetate isobutyrate containing about 2.7 acyl groups and is suitable for use in the manufacture of films, plastic sheeting, and other applications.

Example VI

A partially esterified cellulose acetate isobutyrate of approximately the same degree of substitution as the product of Example V (2.7 acyl groups) is prepared by the procedure used in Example V and in which the same quantities of reagents are used with the exception that the acetaldehyde is replaced by 50 parts of isobutyraldehyde.

The invention is not of course limited to the exact reactants and conditions set out in the above examples but is susceptible rather to a wide range of equivalents. Thus, if cellulose is esterified with acetic anhydride and stearic acid in the presence of acetaldehyde, a partially esterified cellulose acetate stearate is obtained. Likewise, an incompletely esterified cellulose propionate butyrate is obtained if cellulose is esterified with propionic anhydride and butyric acid in the presence of propionaldehyde. If the cellulose is reacted with acetic anhydride and palmitic acid in the presence of benzaldehyde, a partially esterified cellulose acetate palmitate is obtained. In fact, cellulose mixed esters which are incompletely esterified may be prepared by reacting cellulose with any aliphatic monocarboxylic acid bearing no substituents other than hydrocarbon groups, and a carboxylic acid anhydride derived from any aliphatic monocarboxylic acid having a different number of carbon atoms than the acid which is present and bearing no substituent other than hydrocarbon groups, in the presence of any aldehyde. The acid may be saturated or unsaturated, branched or straight chain. As specific examples of the acids which may be used, either as acids or in the form of their anhydrides, may be mentioned: formic, acetic, propionic, lauric, butyric, isobutyric, caproic, palmitic, stearic, crotonic, oleic, acrylic, and sorbic acids. The preferred acids are the saturated aliphatic acids having from 2 to 4 carbon atoms, namely, acetic, propionic, butyric, and isobutyric acids.

The aldehyde used in the esterifying bath may be any aldehyde. It may be aliphatic or aromatic, and may be saturated or unsaturated and branched or straight chain. As specific examples may be mentioned: formaldehyde, acetaldehyde, propionaldehyde, butyraldehyde, iso butyraldehyde, methyl ethyl, acetaldehyde, crotonaldehyde, benzaldehyde, and furfural. The preferred aldehydes are the lower saturated aliphatic aldehydes having from one to four carbon atoms, namely, formaldehyde, acetaldehyde, propionaldehyde, and butyraldehydes.

The amount of aldehyde which may be used varies over rather wide limits and is dependent on the amount of anhydride present in the esterification bath and on the degree of esterification desired in the product. However, it has been found that, for practical purposes and in order to obtain satisfactory results, at least 15% by weight of aldehyde based on the cellulose must be used. Quantities as high as 50 or more parts per 100 of cellulose may be used. The presence of a large excess of anhydride in the esterifying bath requires the presence of larger quantities of aldehyde than necessary when a smaller excess of anhydride is used to obtain any specified degree of partial substitution in the mixed ester. For example, a cellulose acetate propionate having a total substitution of 2.84 acyl groups per glucose unit is obtained with 16 parts of acetaldehyde per 100 parts of cellulose in an esterifying bath containing 360 parts of propionic anhydride, while in a bath containing 560 parts of propionic anhydride per 100 parts of cellulose, 50 parts of acetaldehyde is required to obtain a mixed ester containing 2.86 acyl groups. In esterification baths of similar composition, except for the quantity of acetaldehyde, a bath containing 16 parts of acetaldehyde per 100 parts of cellulose gave a cellulose acetate propionate containing 2.84 acyl groups, while a bath containing 50 parts of acetaldehyde gave an acetate propionate containing 2.28 acyl groups. The preferred proportions of reactants are 15–25 parts of acetaldehyde per 100 parts of cellulose in an esterifying bath containing 300 to 400 parts of propionic anhydride. If other aldehydes and anhydrides are used the preferred proportions are the quantities stoichiometrically equivalent to those specified above.

The amount of aldehyde present in the esterifying bath affects the rate of esterification. The larger the quantity of aldehyde which is present the slower is the reaction rate. For example, in esterifications carried out under identical conditions except for the amount of aldehyde present, it was found that the cellulose goes into solution in the reaction mixture in about 6 to 7 hours when 16 parts of acetaldehyde per 100 parts of cellulose is used, but when 50 parts of acetaldehyde is used a total esterification time of 46 hours is required. The reaction time is also dependent on the amount and kind of catalyst present, as is well known in the cellulose ester art.

Any of the customary cellulose esterification procedures can be used with this invention. The cellulose may be pretreated or not by any of the usual pretreating procedures such as, for example, pretreatment with a lower fatty acid, with or without a catalyst, or pretreatment with water followed by its displacement with a fatty acid or an inert water-miscible solvent such as methanol, and this in turn displaced with an inert solvent such as benzene. The solvent used can be lower fatty acids or inert solvents such as chloroform, methylene chloride, etc. If a fibrous cellulose mixed ester is desired, the esterification can be carried out in the presence of a nonsolvent diluent such as benzene, carbon tetrachloride, or an aliphatic hydrocarbon. The choice of diluent will, of course, depend on the solubility of the mixed ester which is being produced. Any of the usual catalysts may be used. Some of these which are effective are sulfuric acid, mixtures of sulfuric and phosphoric acids, perchloric acid, zinc chloride, etc. The esterification can be conducted in any suitable type of reaction vessel. It is preferable to carry out the reaction in a closed reaction vessel in order to facilitate the recovery of low boiling aldehydes such as acetaldehyde from the reaction mixture.

The esterification is usually conducted for a length of time sufficient to obtain a primary esterification solution which is substantially free of unesterified fibers. If products of lower viscosity are desired, the reaction may be continued until the desired viscosity is reached. The cellulose mixed esters may be precipitated by any of the usual procedures used to precipitate cellulose acetate or other cellulose esters.

Since all cellulose esters made in the presence of sulfuric acid as catalyst contain combined sulfates, it is necessary to remove this combined sulfate in order to obtain cellulose esters of high stability. Accordingly, the partially esterified cellulose mixed esters of this invention which are made in the presence of sulfuric acid may be stabilized by any of the known procedures such as, for example, treatment of the precipitated ester in boiling water, or boiling water containing a very low per cent of sulfuric acid, or by digestion with steam under pressure.

I claim:

1. The process which comprises reacting cellulose in contact with from 15% to about 50% by weight, based on the weight of the cellulose, of a saturated aliphatic aldehyde, with an esterifying reagent comprising an unsubstituted aliphatic monocarboxylic acid containing from 2 to 4 carbon atoms and an anhydride of a different unsubstituted aliphatic monocarboxylic acid, until said cellulose is dissolved, whereby to form directly partially esterified mixed esters of cellulose.

2. The process which comprises reacting cellulose in contact with at least 15% to about 50% by weight, based on the cellulose, of a saturated aliphatic aldehyde, with an esterification reagent selected from the group consisting of acetic acid with propionic anhydride, and acetic anhydride with propionic acid, until said cellulose is dissolved, whereby partially esterified cellulose acetate propionate is directly formed, and isolating the partial ester without saponification.

3. The process which comprises reacting cellulose in contact with at least 15% to about 50% by weight, based on the cellulose, of a saturated aliphatic aldehyde, with acetic acid and propionic anhydride, until said cellulose is dissolved, whereby partially esterified cellulose acetate propionate is directly formed, and isolating the partial ester without saponification.

4. The process which comprises reacting cellulose in contact with at least 15% to about 50% by weight, based on the cellulose, of a saturated aliphatic aldehyde, with an esterification reagent selected from the group consisting of acetic acid with butyric anhydride, and acetic anhydride with butyric acid, until said cellulose is dissolved, whereby partially esterified cellulose acetate butyrate is directly formed, and isolating the partial ester without saponification.

5. The process which comprises reacting cellulose in contact with at least 15% to about 50% by weight, based on the cellulose, of a saturated aliphatic aldehyde, with butyric acid and acetic anhydride, until said cellulose is dissolved, whereby partially esterified cellulose acetate butyrate is directly formed, and isolating the partial ester without saponification.

6. The process which comprises reacting cellulose in contact with from 15 to about 50% by weight based on the cellulose, of acetaldehyde, with an esterifying reagent comprising an unsubstituted aliphatic monocarboxylic acid containing from 2 to 4 carbon atoms and an anhydride of a different unsubstituted aliphatic monocarboxylic acid, until said cellulose is dissolved, whereby to form directly partially esterified mixed esters of cellulose.

7. The process which comprises reacting cellulose in contact with at least 15% to about 50% by weight based on the cellulose, of acetaldehyde, with an esterification reagent selected from the group consisting of acetic acid with propionic anhydride, and acetic anhydride with propionic acid, until said cellulose is dissolved, whereby partially esterified cellulose acetate propionate is directly formed, and isolating the partial ester without saponification.

8. The process which comprises reacting cellulose in contact with at least 15% to about 50% by weight based on the cellulose, of acetaldehyde, with an esterification reagent selected from the group consisting of acetic acid with butyric anhydride, and acetic anhydride with butyric acid, until said cellulose is dissolved, whereby partially esterified cellulose acetate butyrate is directly formed, and isolating the partial ester without saponification.

JULIAN W. HILL.